United States Patent
Ferrara et al.

(10) Patent No.: US 11,826,966 B2
(45) Date of Patent: Nov. 28, 2023

(54) METHOD AND APPARATUS FOR INSERTING A REINFORCING ROD INTO A LAMINATED MATERIAL

(71) Applicant: ROLLS-ROYCE PLC, London (GB)

(72) Inventors: Kim Ferrara, London (GB); Ralph Douglas Cope, Elkton, MD (US); Anthony Dale Johnson, Conowingo, MD (US)

(73) Assignee: ROLLS-ROYCE PLC, London (GB)

( * ) Notice: Subject to any disclaimer, the term of this patent is extended or adjusted under 35 U.S.C. 154(b) by 27 days.

(21) Appl. No.: 17/437,653

(22) PCT Filed: Mar. 2, 2020

(86) PCT No.: PCT/EP2020/055390
§ 371 (c)(1),
(2) Date: Sep. 9, 2021

(87) PCT Pub. No.: WO2020/182505
PCT Pub. Date: Sep. 17, 2020

(65) Prior Publication Data
US 2022/0168969 A1    Jun. 2, 2022

(30) Foreign Application Priority Data
Mar. 9, 2019 (GB) .................................... 1903192

(51) Int. Cl.
*B29C 70/24* (2006.01)
(52) U.S. Cl.
CPC ........ *B29C 70/24* (2013.01); *B29C 2793/009* (2013.01)

(58) Field of Classification Search
CPC ..................................................... B29C 70/24
See application file for complete search history.

(56) References Cited

U.S. PATENT DOCUMENTS

| | | | |
|---|---|---|---|
| 7,105,071 B2 * | 9/2006 | Johnson | B32B 5/18 156/92 |
| 2006/0075618 A1 | 4/2006 | Waidelich et al. | |

FOREIGN PATENT DOCUMENTS

| | | |
|---|---|---|
| EP | 1213383 A2 | 6/2002 |
| GB | 2539249 A | 12/2016 |
| JP | H01238902 A | 9/1989 |

OTHER PUBLICATIONS

Aug. 27, 2019—(GB) UK Search Report—App. No. GB1903192.1.
May 28, 2020—(WO) International Search Report and Written Opinion—PCT/EP2020/055390.

* cited by examiner

*Primary Examiner* — Jeffry H Aftergut
(74) *Attorney, Agent, or Firm* — Banner & Witcoff, Ltd.

(57) ABSTRACT

There is disclosed a method of inserting a reinforcing rod into a hole in a laminated material. The method comprises a feed operation in which a feed clamp clamps a rod whilst moving towards the laminated material to feed an end section of the rod through a guide clamp into a hole in the laminated material. The method further comprises a re-supply operation in which the feed clamp releases the rod and moves relative the rod along a return direction away from the laminated material whilst the guide clamp clamps the rod. A corresponding insertion head for inserting a reinforcing rod, and insertion equipment comprising the insertion head and a controller is also disclosed.

20 Claims, 11 Drawing Sheets

METHOD AND APPARATUS FOR INSERTING A REINFORCING ROD INTO A LAMINATED MATERIAL

CROSS-REFERENCE TO RELATED APPLICATIONS

This application is a U.S. National Stage Application under 35 U.S.C. § 371 of International Application No. PCT/EP2020/055390, filed Mar. 2, 2020, which claims the benefit of priority to United Kingdom Application No. GB 1903192.1, filed Mar. 9, 2019, and the present application claims the benefit of the filing date of both of these prior applications, which are incorporated by reference herein their entireties.

FIELD

The disclosure relates to a method and apparatus for inserting a reinforcing rod into a laminated material.

BACKGROUND

It is known to provide materials having desirable combinations of material properties by building the material in multiple layers, to form a laminated material. Examples of laminated materials are composite structures comprising plies of fibre-reinforced material, such as plies of carbon fibre reinforced plastic (CFRP). Such materials are anisotropic owing to their laminated construction.

It is known to provide through-thickness reinforcement in such laminated materials by inserting reinforcing rods into holes in the laminate material. Such insertion techniques are often referred to as "Z-pinning", with "Z" referring to the thickness direction of a material having plies extending in orthogonal "X" and "Y" directions. Through-thickness reinforcement may improve the resistance of the laminated material to delamination.

In previously considered methods, reinforcing rod may be inserted into a laminated material by positioning a feed mechanism so that an end of a rod is aligned with a hole, and advancing the rod so that it is inserted in the hole.

BRIEF SUMMARY

According to a first aspect, there is provided a method of inserting a reinforcing pin into a pin hole in a laminated material, the method comprising: a feed operation in which a feed clamp clamps a rod whilst moving towards the laminated material to feed an end section of the rod through a guide clamp into a pin hole in the laminated material; and a re-supply operation in which the feed clamp releases the rod and moves relative the rod along a return direction away from the laminated material whilst the guide clamp clamps the rod.

The method may further comprise a cutting operation in which the rod is cut after the feed operation to separate the end section. The method may further comprise a guide separation operation comprising moving the guide clamp away from the laminated material before cutting the rod so that the guide clamp is spaced apart from the end section for cutting. The re-supply operation may take place before the guide separation operation.

The method may further comprise a retrieve operation in which there is relative movement between the feed clamp and the guide clamp whilst the feed clamp clamps the rod so that a protruding end of the rod extending beyond the guide clamp after the guide separation operation is retrieved to terminate within the guide clamp. The re-supply operation may take place after the retrieve operation.

The method may further comprise placing the guide clamp against a hole guide before the feed operation so that there is a continuous feed path for the rod through the guide clamp and the hole guide.

The hole guide may comprise a guide foot engaging the laminated material and a cutter disposed between the guide foot and the guide clamp. The method may comprise cutting the rod after the feed operation to separate the end section by moving the cutter relative the guide foot.

Movement of the feed clamp in the return direction during the re-supply operation may be stopped by abutment of the feed clamp and a return stop. The return stop may be mounted on or integral with the guide clamp or a clamp support to which the guide clamp is mounted.

Movement of the feed clamp towards the laminated material in the feed operation may be stopped by abutment of the feed clamp with a feed stop. The feed stop may comprise a portion of the guide clamp.

The method may comprise simultaneously inserting a plurality of end sections of a plurality of rods into separate pin holes in the laminated material.

The method may further comprise moving the feed clamp and guide clamp away from the pin hole after the re-supply operation and cutting the rod in preparation for tamping of the end section.

According to a second aspect, there is provided an insertion head for inserting a reinforcing rod into a hole in a laminated material, the insertion head comprising: a clamp support; a feed clamp and a guide clamp coupled to the clamp support and spaced apart along a rod feed path; wherein the feed clamp is moveable towards the guide clamp whilst clamping a rod to feed an end section of the rod through the guide clamp into a hole of the laminated material; and wherein the guide clamp is configured to selectively clamp the rod to permit the feed clamp to move relative the rod along a return direction away from the guide clamp.

The insertion head may further comprise a cutter for cutting the rod to separate the end section.

The insertion head may further comprise a hole guide for guiding the end section of the rod into the pin hole. At least the guide clamp may be moveable relative the hole guide to align the guide clamp with the hole guide so that there is a continuous feed path for the rod through the guide clamp and the hole guide.

The clamp support may be moveable relative the hole guide to align the guide clamp with the hole guide. The hole guide may comprise a guide foot for engaging the laminated material and a cutter disposed between the guide foot and the guide clamp, wherein the cutter may be moveable relative the guide foot to cut the rod and separate the end section.

The insertion head may further comprise a return stop configured to stop movement of the feed clamp away from the guide clamp. The return stop may be mounted on or integral with the guide clamp or the clamp support to which the guide clamp is coupled.

The insertion head may comprise a feed stop configured to stop movement of the feed clamp towards the guide clamp to feed the end section through the guide clamp. The feed stop may comprise a portion of the guide clamp. The feed stop may be mounted on or integral with the guide clamp or the clamp support to which the guide clamp is mounted.

The feed clamp and the guide clamp may each be configured to clamp multiple rods for inserting a plurality of reinforcing pins into separate pin holes in a laminated material.

According to a third aspect, there is provided insertion equipment comprising: an insertion head in accordance with the second aspect; and a controller configured to control movement of the feed clamp and the guide clamp to: execute a feed operation in which the feed clamp clamps the rod whilst moving towards the laminated material to feed an end section of the rod through the guide clamp into a pin hole in the laminated material; and execute a re-supply operation in which the feed clamp releases the rod and moves relative the rod along a return direction away from the laminated material whilst the guide clamp clamps the rod.

The controller may be further configured to execute a cutting operation after the feed operation by moving the cutter to separate the end section.

The controller may be further configured to execute a guide separation operation by moving the guide clamp away from the laminated material before the cutting operation so that the guide clamp is spaced apart from the end section for cutting.

The controller may be configured to execute the re-supply operation before the guide separation operation.

The controller may be further configured to execute a retrieve operation by causing relative movement between the feed clamp and the guide clamp whilst the feed clamp clamps the rod so that a protruding end of the rod extending beyond the guide clamp after the guide separation operation is retrieved to terminate within the guide clamp. The controller may be configured to execute the re-supply operation after the retrieve operation.

The controller may be further configured to control movement of the guide clamp so that the guide clamp is positioned against the hole guide before the feed operation so that there is a continuous feed path for the rod through the guide clamp and the hole guide.

The controller may be further configured to control movement of the feed clamp and guide clamp to move the feed clamp and the guide clamp away from the pin hole after the re-supply operation and cutting operation in preparation for tamping of the end section.

According to a fourth aspect, there is provided a method of inserting a reinforcing pin into a pin hole in a laminated material, the method comprising: a feed operation in which a feed clamp clamps a rod whilst moving towards the laminated material to feed an end section of the rod through a guide clamp into a pin hole in the laminated material; a re-supply operation in which the feed clamp releases the rod and moves relative the rod along a return direction away from the laminated material whilst the guide clamp clamps the rod; and placing the guide clamp against a hole guide before the feed operation so that there is a continuous feed path for the rod through the guide clamp and the hole guide.

The method may further comprise a cutting operation in which the rod is cut after the feed operation to separate the end section. The method may further comprise a guide separation operation comprising moving the guide clamp away from the laminated material before cutting the rod so that the guide clamp is spaced apart from the end section for cutting. The re-supply operation may take place before the guide separation operation.

The method may further comprise a retrieve operation in which there is relative movement between the feed clamp and the guide clamp whilst the feed clamp clamps the rod so that a protruding end of the rod extending beyond the guide clamp after the guide separation operation is retrieved to terminate within the guide clamp. The re-supply operation may take place after the retrieve operation.

The hole guide may comprise a guide foot engaging the laminated material and a cutter disposed between the guide foot and the guide clamp. The method may comprise cutting the rod after the feed operation to separate the end section by moving the cutter relative the guide foot.

Movement of the feed clamp in the return direction during the re-supply operation may be stopped by abutment of the feed clamp and a return stop. The return stop may be mounted on or integral with the guide clamp or a clamp support to which the guide clamp is mounted.

Movement of the feed clamp towards the laminated material in the feed operation may be stopped by abutment of the feed clamp with a feed stop. The feed stop may comprise a portion of the guide clamp.

The method may comprise simultaneously inserting a plurality of end sections of a plurality of rods into separate pin holes in the laminated material.

The method may further comprise moving the feed clamp and guide clamp away from the pin hole after the re-supply operation and cutting the rod in preparation for tamping of the end section.

According to a fifth aspect, there is provided an insertion head for inserting a reinforcing rod into a hole in a laminated material, the insertion head comprising: a clamp support; a feed clamp and a guide clamp coupled to the clamp support and spaced apart along a rod feed path; and a hole guide for guiding the end section of the rod into the pin hole; wherein the feed clamp is moveable towards the guide clamp whilst clamping a rod to feed an end section of the rod through the guide clamp into a hole of the laminated material; wherein the guide clamp is configured to selectively clamp the rod to permit the feed clamp to move relative the rod along a return direction away from the guide clamp; and wherein at least the guide clamp is moveable relative the hole guide to align the guide clamp with the hole guide so that there is a continuous feed path for the rod through the guide clamp and the hole guide.

The insertion head may further comprise a cutter for cutting the rod to separate the end section.

The clamp support may be moveable relative the hole guide to align the guide clamp with the hole guide. The hole guide may comprise a guide foot for engaging the laminated material and a cutter disposed between the guide foot and the guide clamp, wherein the cutter may be moveable relative the guide foot to cut the rod and separate the end section.

The insertion head may further comprise a return stop configured to stop movement of the feed clamp away from the guide clamp. The return stop may be mounted on or integral with the guide clamp or the clamp support to which the guide clamp is coupled.

The insertion head may comprise a feed stop configured to stop movement of the feed clamp towards the guide clamp to feed the end section through the guide clamp. The feed stop may comprise a portion of the guide clamp. The feed stop may be mounted on or integral with the guide clamp or the clamp support to which the guide clamp is mounted.

The feed clamp and the guide clamp may each be configured to clamp multiple rods for inserting a plurality of reinforcing pins into separate pin holes in a laminated material.

According to a sixth aspect, there is provided insertion equipment comprising: an insertion head in accordance with the fifth aspect; and a controller configured to control movement of the feed clamp and the guide clamp to: execute a feed operation in which the feed clamp clamps the rod whilst moving towards the laminated material to feed an end section of the rod through the guide clamp into a pin hole in the laminated material; and execute a re-supply operation in which the feed clamp releases the rod and moves relative the rod along a return direction away from the laminated material whilst the guide clamp clamps the rod wherein the controller is further configured to control movement of the guide clamp so that the guide clamp is positioned against the hole guide before the feed operation so that there is a continuous feed path for the rod through the guide clamp and the hole guide.

The controller may be further configured to execute a cutting operation after the feed operation by moving the cutter to separate the end section.

The controller may be further configured to execute a guide separation operation by moving the guide clamp away from the laminated material before the cutting operation so that the guide clamp is spaced apart from the end section for cutting.

The controller may be configured to execute the re-supply operation before the guide separation operation.

The controller may be further configured to execute a retrieve operation by causing relative movement between the feed clamp and the guide clamp whilst the feed clamp clamps the rod so that a protruding end of the rod extending beyond the guide clamp after the guide separation operation is retrieved to terminate within the guide clamp. The controller may be configured to execute the re-supply operation after the retrieve operation.

The controller may be further configured to control movement of the feed clamp and guide clamp to move the feed clamp and the guide clamp away from the pin hole after the re-supply operation.

According to a seventh aspect, there may be provided a method of inserting a reinforcing rod into a hole in a laminated material, the method comprising: a feed operation in which a feed clamp clamps a rod whilst moving towards the laminated material to feed an end section of the rod through a guide clamp into a hole in the laminated material; a re-supply operation in which the feed clamp releases the rod and moves relative the rod along a return direction away from the laminated material whilst the guide clamp clamps the rod; a cutting operation in which the rod is cut to separate the end section; a guide separation operation comprising moving the guide clamp away from the laminated material before cutting the rod so that the guide clamp is spaced apart from the end section for cutting; and a retrieve operation in which there is relative movement between the feed clamp and the guide clamp whilst the feed clamp clamps the rod so that a protruding end of the rod extending beyond the guide clamp after the guide separation operation is retrieved to terminate within the guide clamp.

The re-supply operation may take place before the guide separation operation. The re-supply operation may take place after the retrieve operation.

Movement of the feed clamp towards the laminated material in the feed operation may be stopped by abutment of the feed clamp with a feed stop.

The method may further comprises simultaneously inserting a plurality of end sections of a plurality of rods into separate pin holes in the laminated material.

According to an eighth aspect, there is provided insertion equipment comprising: an insertion head in accordance with the second aspect; and a controller configured to control movement of the feed clamp and the guide clamp to: execute a feed operation in which the feed clamp clamps the rod whilst moving towards the laminated material to feed an end section of the rod through the guide clamp into a pin hole in the laminated material; execute a re-supply operation in which the feed clamp releases the rod and moves relative the rod along a return direction away from the laminated material whilst the guide clamp clamps the rod; execute a cutting operation after the feed operation by moving the cutter to separate the end section; execute a guide separation operation by moving the guide clamp away from the laminated material before the cutting operation so that the guide clamp is spaced apart from the end section for cutting; and execute a retrieve operation by causing relative movement between the feed clamp and the guide clamp whilst the feed clamp clamps the rod so that a protruding end of the rod extending beyond the guide clamp after the guide separation operation is retrieved to terminate within the guide clamp.

The controller may be configured to execute the re-supply operation after the retrieve operation.

The controller may be configured to control movement of the feed clamp and guide clamp to move the feed clamp and the guide clamp away from the pin hole after the re-supply operation and cutting operation in preparation for tamping of the end section.

The invention may comprise any combination of the features and/or limitations referred to herein, except combinations of such features as are mutually exclusive.

DESCRIPTION OF THE DRAWINGS

Embodiments of the invention will now be described, by way of example, with reference to the accompanying drawings, in which.

DETAILED DESCRIPTION

Figure 1:
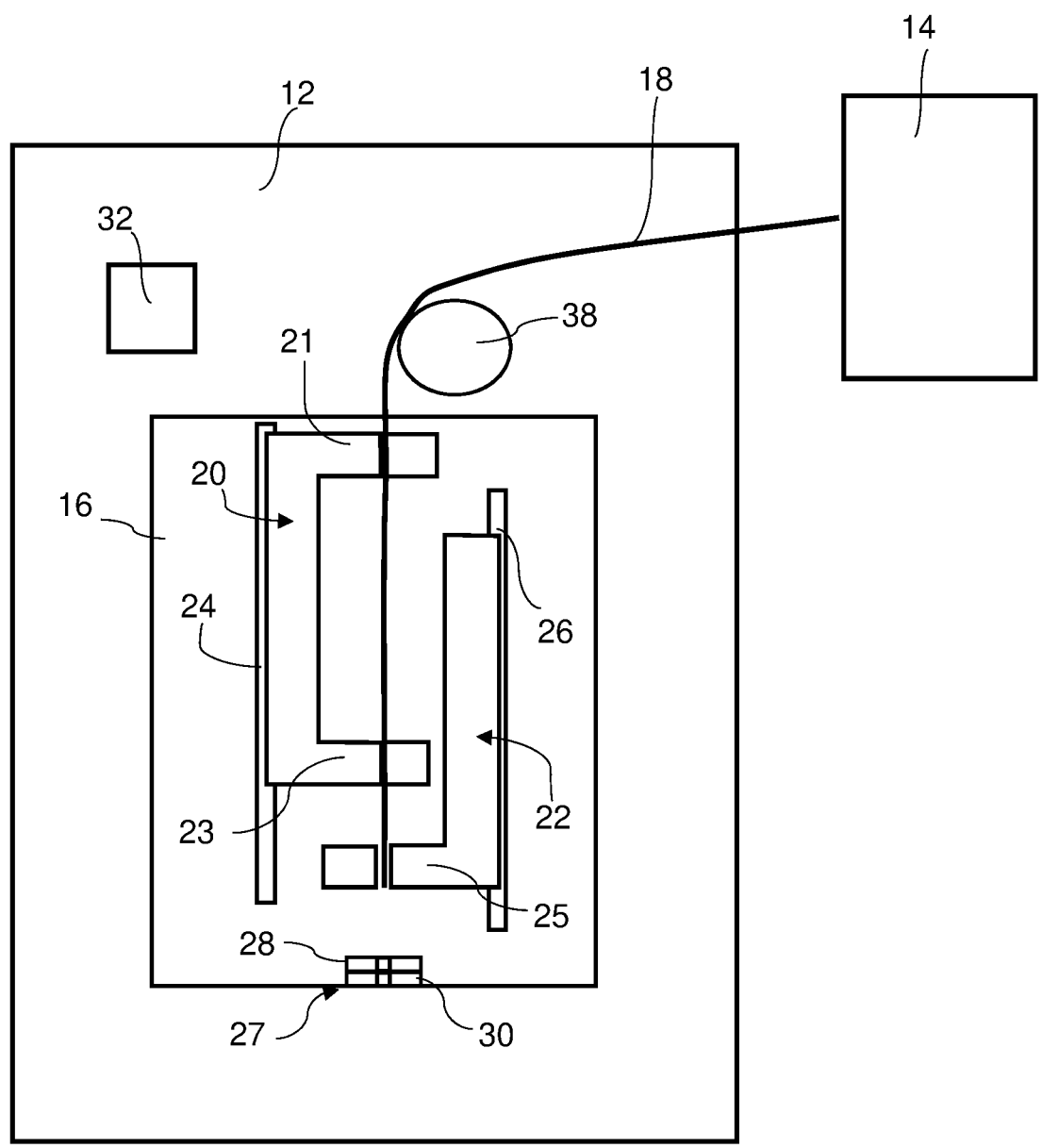
FIG. 1 schematically shows a cutaway view of an insertion head with a rod supply.

FIG. 1 shows a cutaway view of an insertion equipment 10 comprising an insertion head 12 and a rod supply 14. The insertion head 12 is configured to receive a reinforcing rod 18 from the rod supply 14 and insert an end section of the rod 18 into a pin hole in a laminated material laminated material. The rod supply 14 comprises a spool of reinforcing rod 18 which is fed into the insertion head 12. The rod supply 14 may comprise a tensioning device to maintain a constant tension to the rod 18.

The insertion head 12 comprises a clamp support 16, a feed clamp unit 20 and a guide clamp unit 22. The feed clamp unit 20 is slideably mounted to a feed rail 24 which is fixedly mounted to the clamp support 16. The guide clamp unit 22 is slideably mounted to a guide rail 26 which is fixedly mounted to the clamp support 16 and extends parallel to the feed rail 24. The feed clamp unit 20 is linearly moveable along the feed rail 24 and the guide clamp unit 22 is linearly moveable along the guide rail 26. The guide clamp unit 22 and feed clamp unit 20 are therefore moveable in parallel directions to one another.

In this example, the feed clamp unit 20 comprises an upper feed clamp 21 and a lower feed clamp 23 which are connected by a carrier and spaced apart along a direction parallel with the feed rail 24. The carrier is slideably attached to the feed rail 24. The upper feed clamp 21 and lower feed clamp 23 extend perpendicularly from the carrier and the feed rail 24 and are configured to selectively clamp the rod 18.

The guide clamp unit 22 comprises a guide clamp 25 and a carrier which is slideably attached to the guide rail 26. The guide clamp 25 extends perpendicularly from the backbone and the guide rail 26, and is configured to selectively clamp the rod 18.

Each of the clamps 21, 23, 25 defines a respective clamp passageway through which reinforcement rod can be received. The feed clamp unit 20 and the guide clamp unit 22 are arranged so that the clamp passageways of the respective clamps are aligned to define a rod feed path extending through the feed clamp 20 and the guide clamp 22. As shown in FIG. 1, the rod feed path (where the rod 18 extends through the clamps) is parallel with the feed rail 24 and the guide rail 26.

The insertion head 12 further comprises a hole guide 27 comprising a cutter 28 for cutting the reinforcing rod 18 and a guide foot 30 for guiding the reinforcing rod 18 into the hole in the laminated material. In this example, the guide foot 30 is a flat plate comprising a hole for the reinforcing rod 18, and the cutter 28 is a flat plate overlying the guide foot 30 and comprising a hole for the reinforcing rod. The cutter 28 is positioned between the guide foot 30 and the guide clamp 25, on top of the guide foot 30. The cutter 28 has a first position relative the guide foot 30 in which the hole in the cutter 28 is aligned with the hole in the guide foot 30 to allow the rod 18 to pass through the hole guide 27 unimpeded when being fed along the rod feed path into the hole in the laminated material. The cutter 28 is moveable relative the guide foot 30 in the plane of the cutter 28, perpendicular to the rod feed path, to a second position to move the holes in the cutter 28 and the guide foot 30 out of alignment and cut the rod 18. In other examples, the hole guide may be separate from the insertion head 12, such that the insertion head 12 is moveable relative the hole guide to engage the hole guide.

The insertion head 12 further comprises a redirect roller 38 configured to receive the rod 18, and to support the rod 18 to run along the rod feed path before it enters the clamps 20, 22.

In this example, the insertion head comprises a controller 32 to control the movement of the feed clamp 20 and the guide clamp 22 along their respective rails 24, 26, and the clamping and releasing of the feed clamp 20 and the guide clamp 22. In other examples, such a controller may be provided separate from the insertion head 12. For example, the clamps may be controlled by a remote computer or controller which controls the clamps, for example by a wired or wireless connection.

In this example, the insertion head 12 is mounted to a robotic arm (not shown) to move the insertion head 12 relative to a laminated material as will be described below. In other examples, the insertion head 12 could be mounted to a gantry system for movement relative a laminated material.

FIG. 1 shows the insertion head 12 in an initial configuration in preparation for an insertion method.

In the initial configuration of FIG. 1, the rod 18 from the rod supply 14 is received on the redirect roll 38, and passes along the feed path through the upper feed clamp 21 of the feed clamp unit 20, the lower feed clamp 23 of the feed clamp unit 20 and the guide clamp 25. The guide clamp 25 is spaced apart from the hole guide 27 and the feed clamps 21, 23 are spaced apart from each other and the guide clamp 22. The upper clamp 21 of the feed clamp 20 may help to guide the rod 18 to the lower clamp 23. The rod 18 terminates at the guide clamp 22 such that it does not extend beyond the guide clamp 22.

In FIG. 1, the feed clamp 20 is in a clamped configuration in which both the upper clamp 21 and the lower clamp 23 clamp the rod 18. The guide clamp 20 is in a released configuration in which the rod 18 is released and not therefore not clamped.

FIGS. 2-9 show various configurations of the insertion head 12 in use during a method of inserting a reinforcing rod 18, in which the reinforcing rod 18 is inserted along the rod feed path into a hole 42 in a laminated material 40. In this example, the insertion method comprises at least a feed operation, a resupply operation, a guide separation operation, a cutting operation and a retrieve operation.

Figure 2:
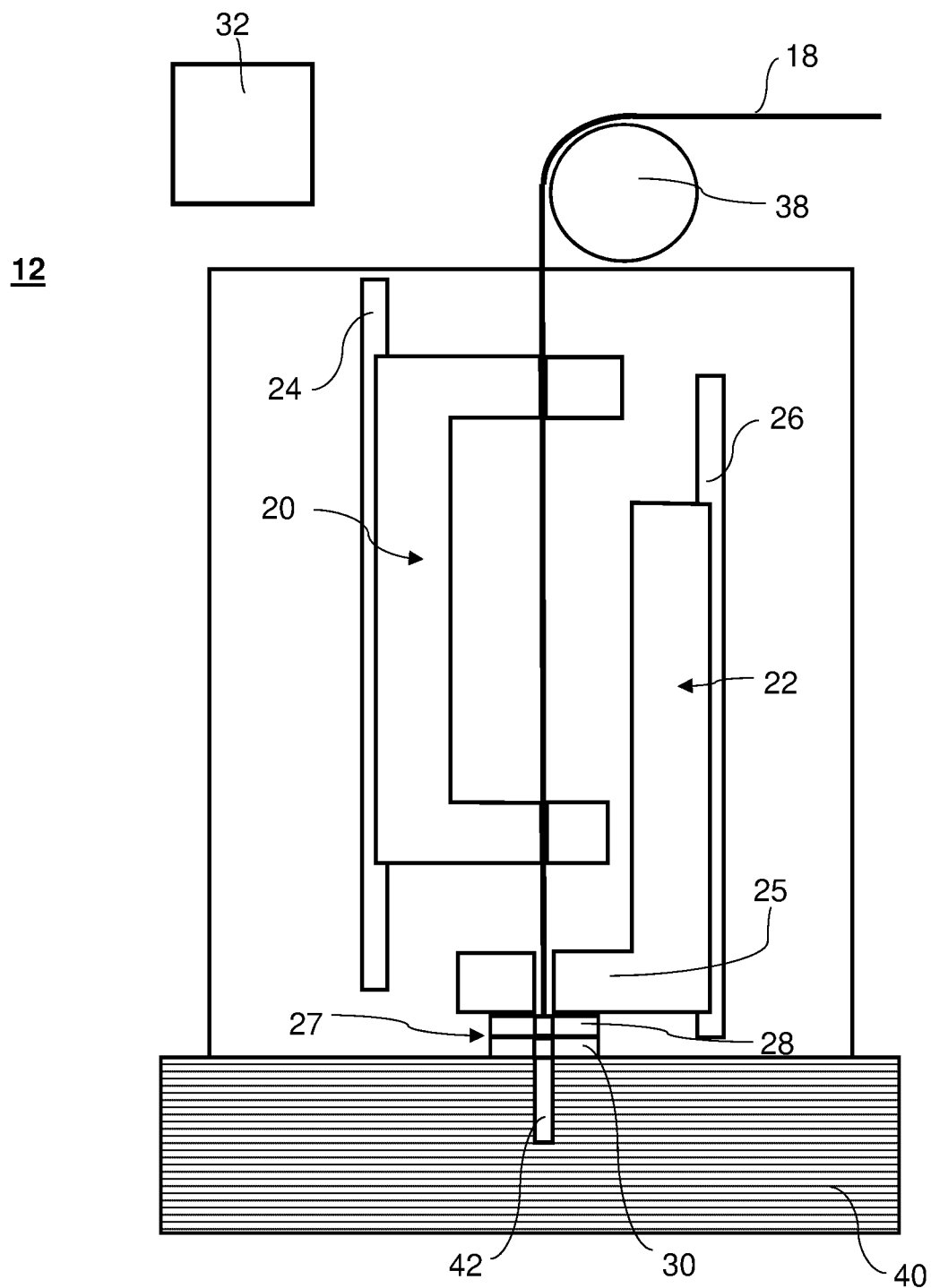
FIGS. 2-9 schematically show the insertion head of FIG. 1 as configured at successive stages of a method of inserting reinforcing rod into a laminated material.
Figure 3:
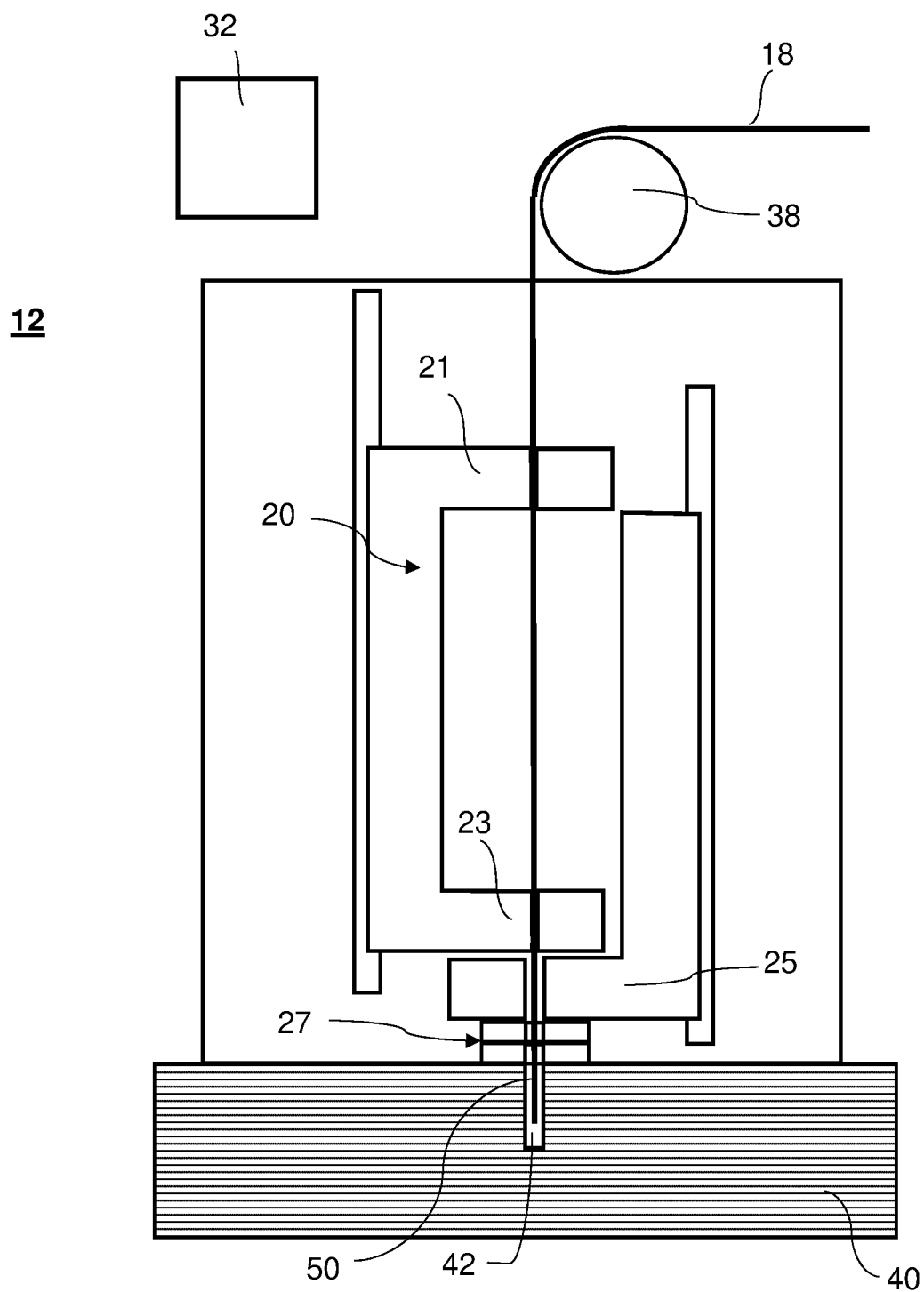
Figure 4:
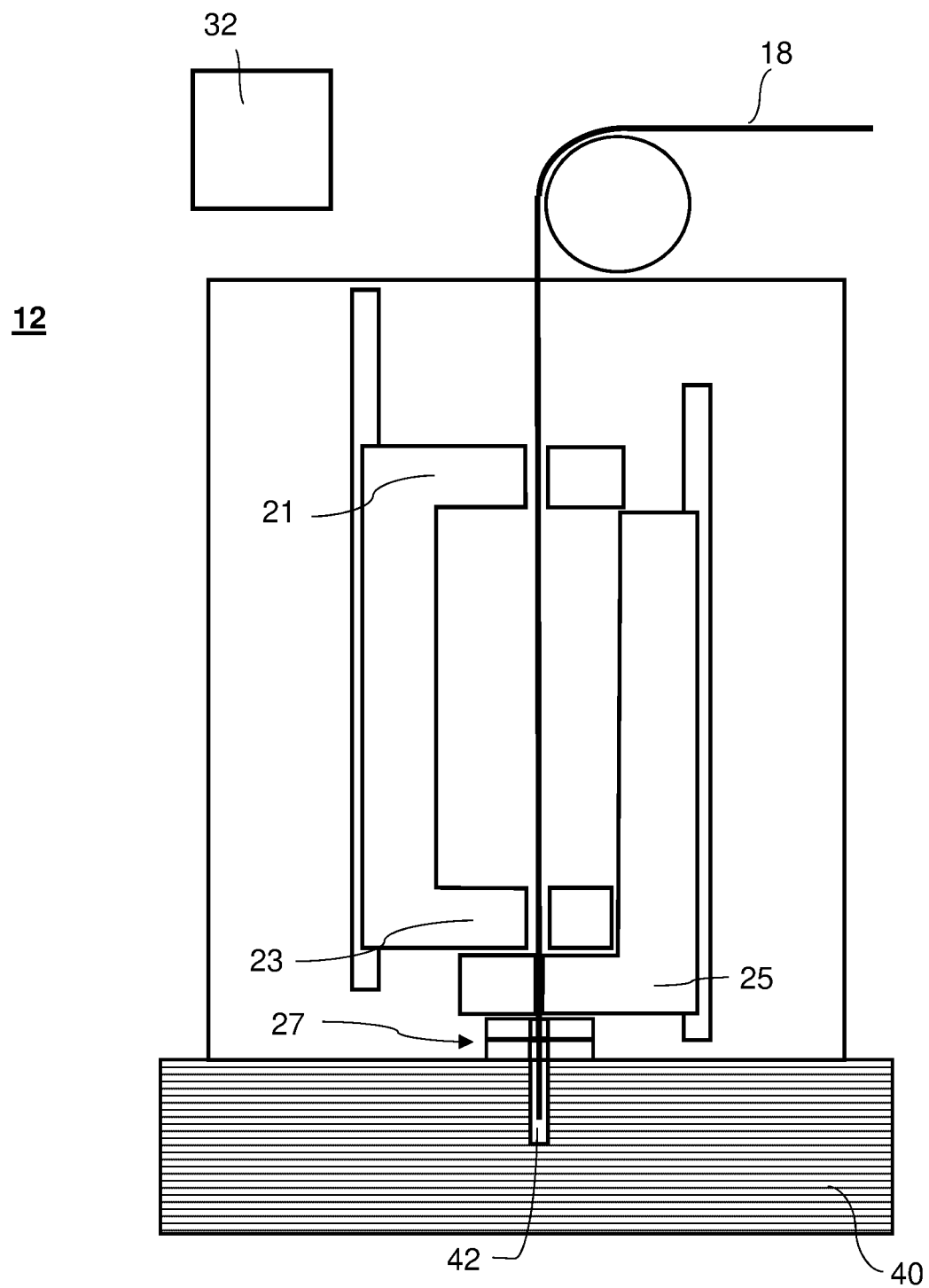
Figure 5:
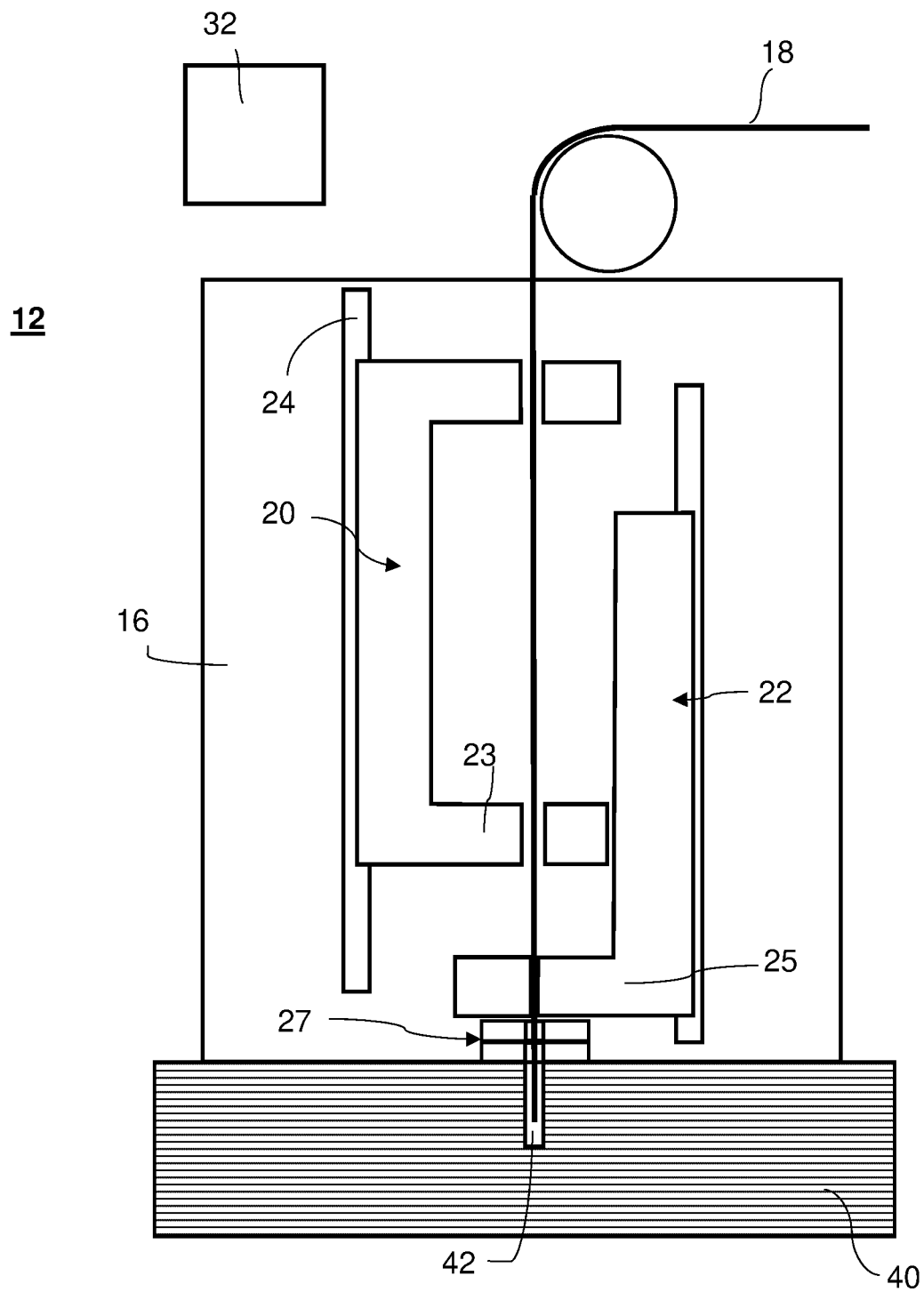
Figure 6:
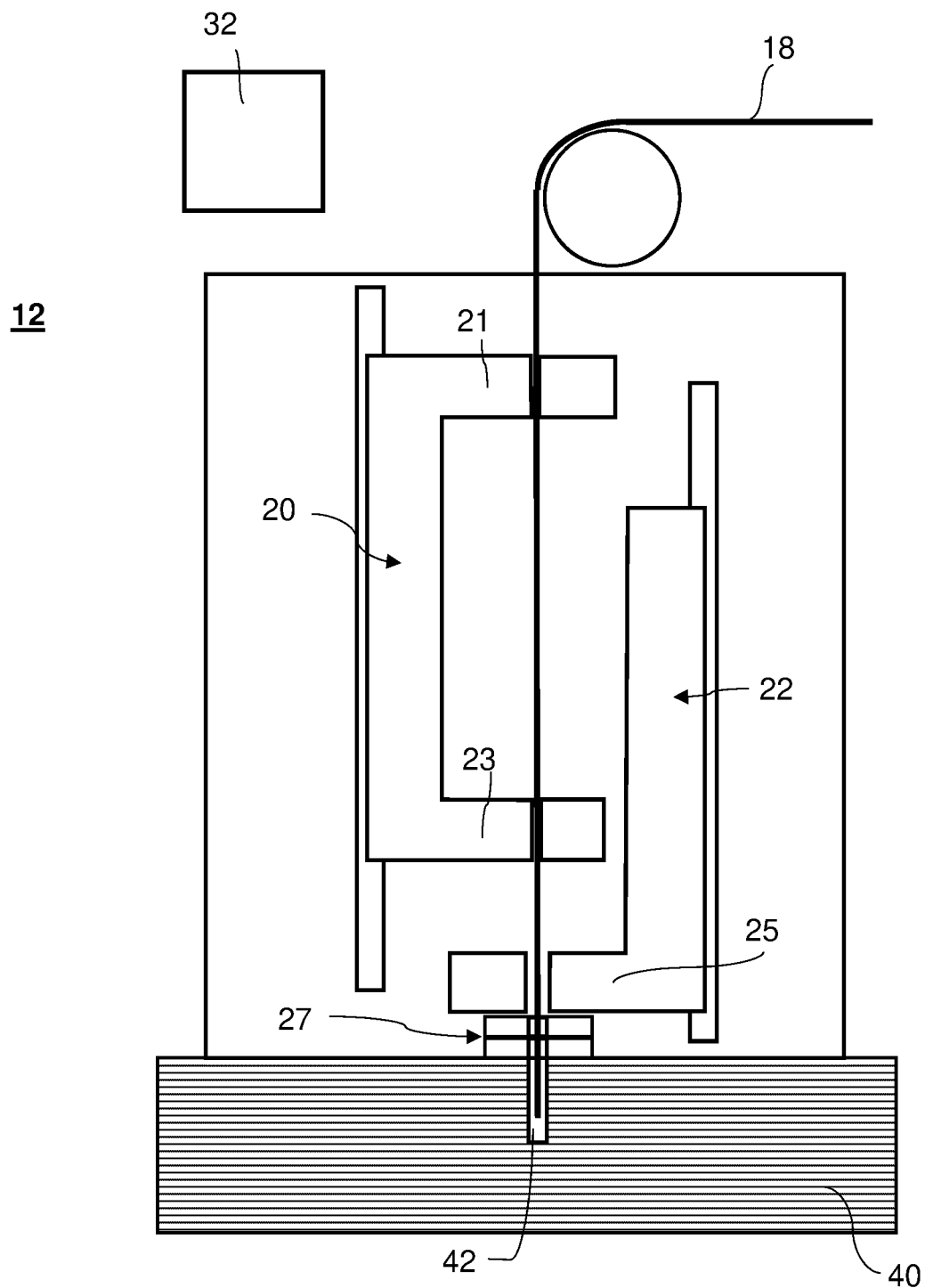
Figure 7:
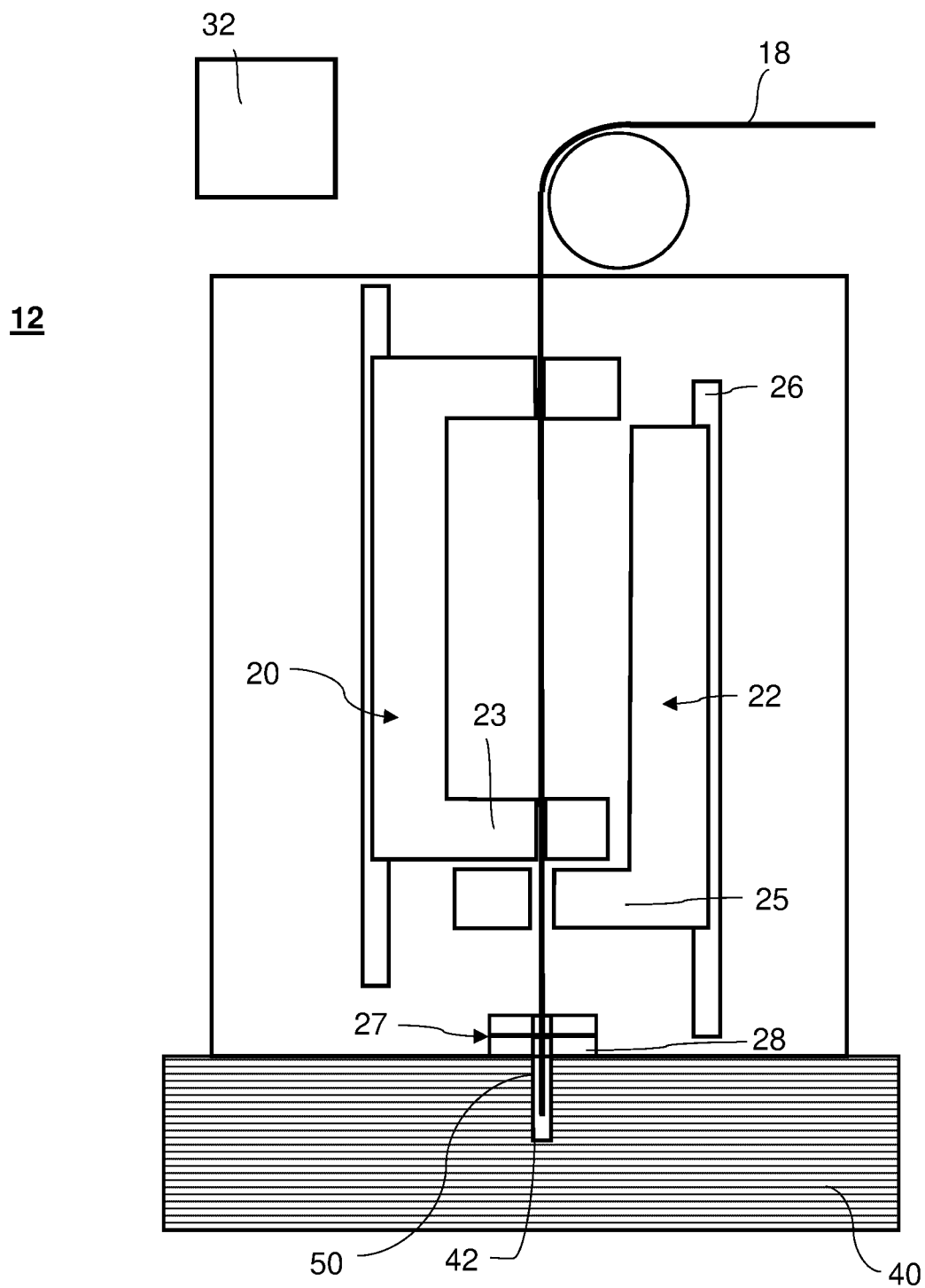
Figure 8:
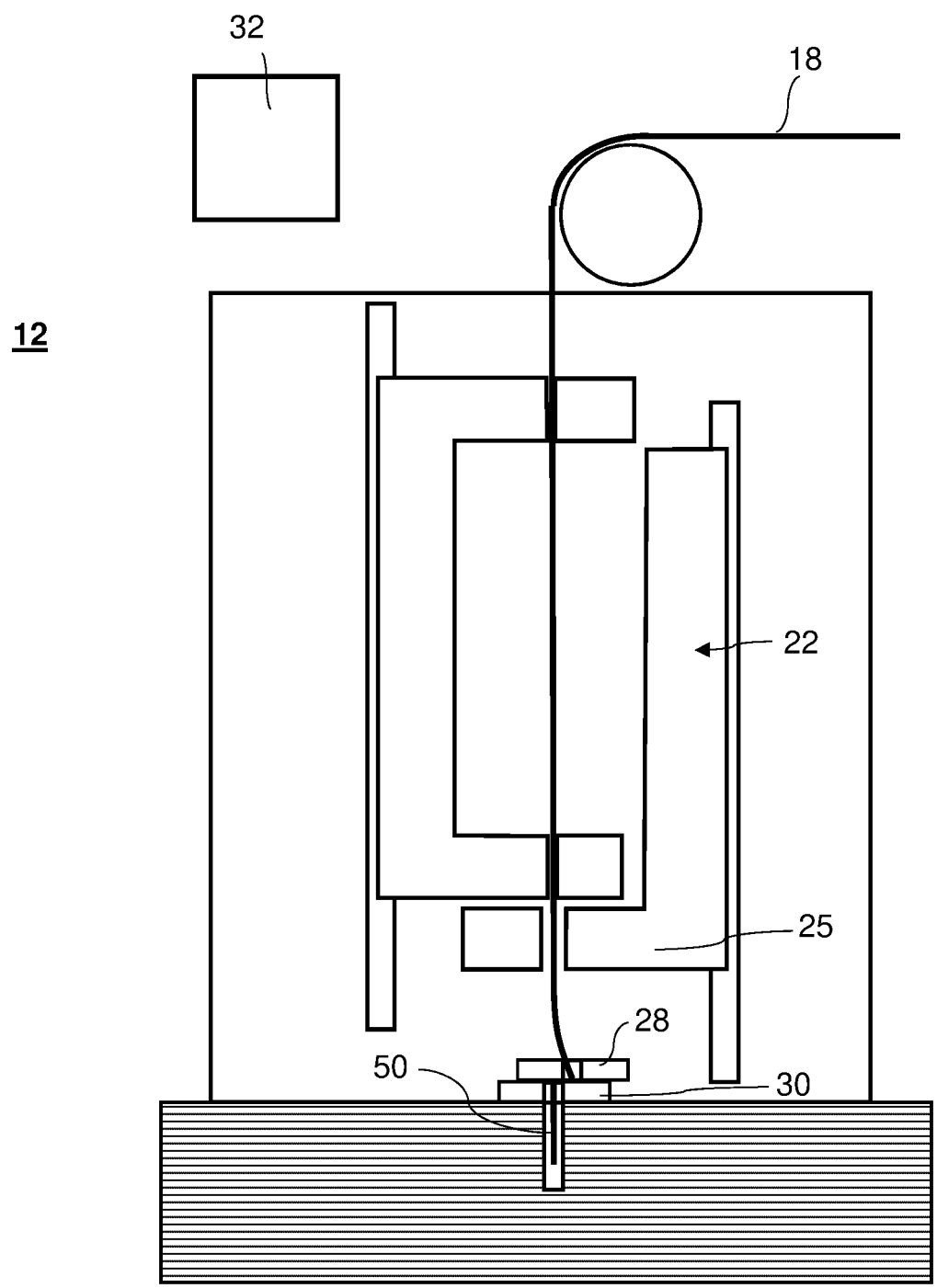
Figure 9:
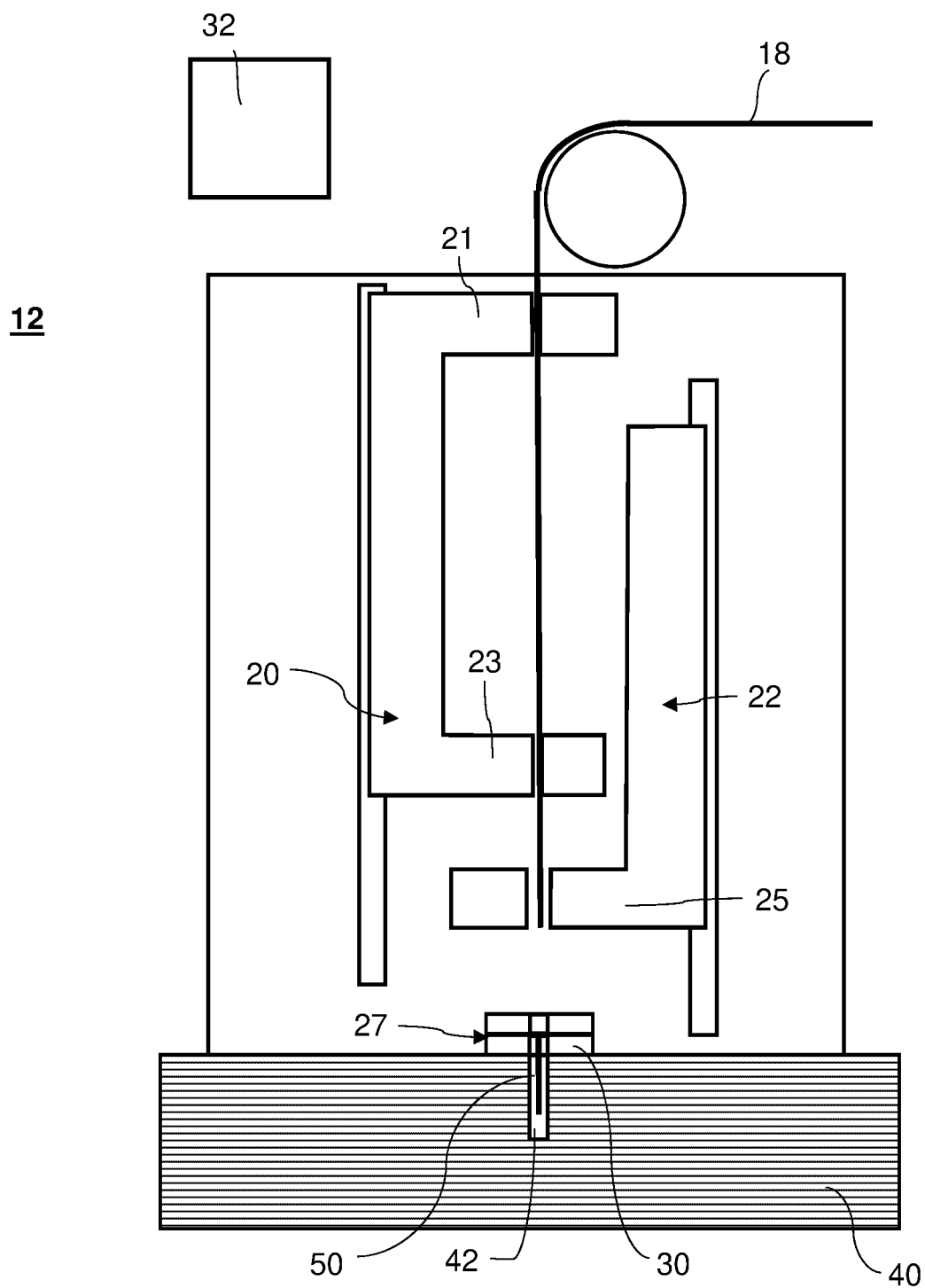

The configurations of the insertion head 12 during and after the feed operation are shown in FIGS. 2-3. The configurations of the insertion head 12 during and after the resupply operation are shown in FIG. 4-6. The configuration of the insertion head 12 after the guide separation operation is shown in FIG. 7. The configuration of the insertion head 12 after the cutting operation is shown in FIG. 8. The configuration of the insertion head 12 after the retrieve operation is shown in FIG. 9.

A method of inserting reinforcing rod into a laminated material will now be described with reference to FIGS. 1-9.

The insertion head 12 is moved from the initial configuration so that the guide foot 30 of the hole guide 27 is positioned on a laminated material 40 having a hole 42 for receiving reinforcing rod, as shown in FIG. 2. The insertion head 12 is moved relative the laminated material so that the holes in the guide foot 30 and cutter 28 of the hole guide 27 are aligned with the hole 42 in the laminated material. Therefore, there is a continuous channel through the holes in the cutter 28, the guide foot 30 and the laminated material 40 through which reinforcing rod 18 may pass. The hole guide 27 remains on the laminated material 40 for the duration of the insertion method described below. In other examples, a hole guide may be separate from an insertion head and so the insertion head may be moved relative a laminated material to align the insertion head with a hole guide in position on the laminated material over a hole.

The controller 32 causes the feed clamp unit 20 and the guide clamp unit 22 to move in unison in a feed direction along the feed rail 24 and guide rail 26 respectively until the guide clamp 25 abuts the hole guide 27, as shown in FIG. 2. The feed direction is towards the laminated material 40 and away from the redirect roller 38, parallel to the feed rail 24 and the guide rail 26. The movement of the feed clamp unit 20 and guide clamp unit 22 is controlled by the controller 32 and is stopped when the guide clamp 25 abuts the cutter 28 of the hole guide 27. The guide clamp 25 may clamp the rod 18 during movement towards the hole guide 27.

With the guide clamp 25 in abutment with the hole guide 27, the guide clamp 25 is released such that a continuous feed path is formed from the guide clamp 25 through the hole guide 27 to the hole 42 in the laminated material 40, as shown in FIG. 2. The rod 18 terminates in the guide clamp 25 so that it does not protrude from the guide clamp 25. The feed clamp unit 20 remains in a clamped configuration and is spaced apart from the guide clamp 25.

A feed operation is executed in which the controller 32 causes the feed clamp unit 20 to move further along the feed direction whilst the feed clamps 21, 23 clamp the rod 18, thereby moving the rod 18 in the feed direction so that an end section 50 of the rod 18 passes through the hole guide 27 and into the hole 42 in the laminated material 40, as shown in FIG. 3. The feed clamp unit 20 is moved until a predetermined amount of rod 18 has been inserted into the hole 42. In this example, the feed clamp unit 20 is configured so that it abuts the guide clamp 25 when the predetermined amount of rod has been inserted into the hole 42.

When the feed clamp unit 20 moves the rod 18 towards the laminated material 40, a tensioning device of the rod supply 14 feeds out a length of rod 18 to keep the tension in the rod 18 constant.

In this example, the feed operation feeds an end section 50 of the rod 18 corresponding to the depth of the hole 42. For example, the hole may be 30 mm deep, the hole guide may be 4 mm deep, and the feed clamp unit 20 may move towards the guide clamp unit 22 by 34 mm to guide an end section of at least 30 mm into the hole 42, with a further portion of the rod 18 extending through the hole guide 27. In other examples, there may be a succession of smaller feed operations interspersed with resupply operations (as will be described below). By conducting smaller feed operations, a distance between the lower feed clamp 23 and the guide clamp 25 may be minimised, which may help to prevent inadvertent fracture of the rod 18.

Following the feed operation, a resupply operation is executed in which the controller 32 causes the guide clamp 25 to clamp the rod 18, and causes the feed clamps 21, 23 to release the rod 18, as shown in FIG. 4. The clamp and release of the guide clamp 25 and feed clamps 21, 23 may occur sequentially or simultaneously.

The resupply operation further comprises the controller 32 causing the feed clamp unit 20 to move along the feed rail 24 in a return direction which is parallel and opposite to the feed direction so that the lower feed clamp 23 is spaced apart from the guide clamp 25, as shown in FIG. 5. The guide clamp unit 22 does not move and therefore holds the rod 18 in place in the hole 42 of the laminated material 40 while the feed clamp unit 20 moves away from the laminated material.

In this example, the movement of the feed clamp 20 in the return direction is controlled by and terminated the controller 32. However, in other examples the movement of the feed clamp 20 in the return direction could be restricted by a return stop. The return stop could be mounted to the clamp support 16 or to the guide clamp 22 or could be integral with the guide clamp 22.

In this example, the feed clamp unit 20 is moved along the return direction in the resupply operation by an amount corresponding to the depth of a further hole in the laminated material to be provided with reinforcement rod. Accordingly, a corresponding length of fibre reinforcement can subsequently be guided through the guide clamp 25 and into the hole. In other examples, there may be a succession of smaller feed operations and re-supply operations to gradually guide a length of reinforcement rod into a hole. For example, a 30 mm length of reinforcing rod may be guided by five feed operations in which 6 mm lengths of reinforcing rod are guided into the hole, interspersed with five resupply operations in which the feed clamp unit 20 moves away from the guide clamp 25 to clamp a new portion of the rod 18 to feed towards the laminated material.

The controller 32 causes the feed clamps 21, 23 to move to the clamped configuration to clamp the rod 18, and causes the guide clamp 25 to move to the released configuration to release the rod 18, as shown in FIG. 6.

In this example, after the resupply operation is complete (as shown in FIG. 6), the controller executes a guide separation operation and then a cutting operation as will be described below. However, in other examples, the controller 32 may execute and complete one or more further feed operations and resupply operations if a depth of rod 18 inserted into the laminated material 40 is not sufficient after a single feed operation. Any number of feed operations and resupply operations can follow until there is a sufficient length of rod 18 in the hole 42 in the laminated material 40.

A guide separation operation is executed in which the controller 32 causes the guide clamp unit 22, which is in the released configuration following the resupply operation, to move in the return direction along the guide rail 26, away from the laminated material 40 whilst the feed clamp 20 holds the rod 18 in place, as shown in FIG. 7. The purpose of the guide separation operation is to move the guide clamp 22 away from the cutter 28 whilst holding the end section 50 of the rod 18 in the hole 42 in the laminated material 40.

Although in this example, the feed clamp 23 and guide clamp 25 are abutting at the end of the guide separation operation as shown in FIG. 7, in other examples the guide clamp unit 22 may move along the return direction so that it is spaced apart from both the feed clamp 23 and the hole guide 27.

FIG. 8 shows the configuration of the insertion head 12 during the cutting operation. In the cutting operation, the controller 32 causes the cutter 28 to move in the plane of the cutter 28 and perpendicular to the rod feed path relative the guide foot 30. The cutter 28 moves until the holes in the cutter 28 and the guide foot 30 are no longer aligned such that the edges of the holes shear the rod 18 at the interface between the cutter 28 and the guide foot 30, thereby separating the end section 50 of the rod 18 held by the clamps.

Since the guide clamp unit 22 has moved away from the cutter 28 in the guide separation operation, such that it no longer abuts the cutter 28, a protruding portion of rod 18 between the guide clamp 25 and the guide foot 30 is free to deflect as the cutter 28 moves. This freedom to deflect reduces the risk of the rod 18 breaking at a second point between the cutter 28 and the guide clamp 22.

Once the rod 18 has been cut, the cutter 28 returns to its position on the guide foot 30, with the holes of the cutter 28 and the guide foot 30 aligned.

Following cutting, a retrieve operation is executed in which there is relative movement between the feed clamps 21, 23 and the guide clamp 25. In this example, the controller 32 causes the feed clamp unit 20 to move further in the return direction relative the guide clamp unit 22 whilst clamping the rod 18. This draws the end of the rod 18 which protrudes from the guide clamp 25 after the cutting operation (as shown in FIG. 8) through the guide clamp 25 so that the end of the rod 18 terminates in the guide clamp 25 as shown in FIG. 9.

Retrieving the end of the rod 18 so that it does not extend from the guide clamp 25 would alternatively be possible by moving the guide clamp unit 22 relative the feed clamp unit 20 in the feed direction.

A tamper can be used after the cutting operation to push the end section 50 further into the hole 42 in the laminated material 40. At the end of the insertion method as shown in FIG. 9, the configuration of the insertion head 12 is the same as the initial configuration described above with respect to FIG. 1 (albeit with the guide foot 30 engaging the laminated material 40). Therefore, after the tamper has been used, the insertion head 12 is in a configuration to repeat the insertion process to insert a new end section into a different hole in the laminated material 40.

Figure 10:
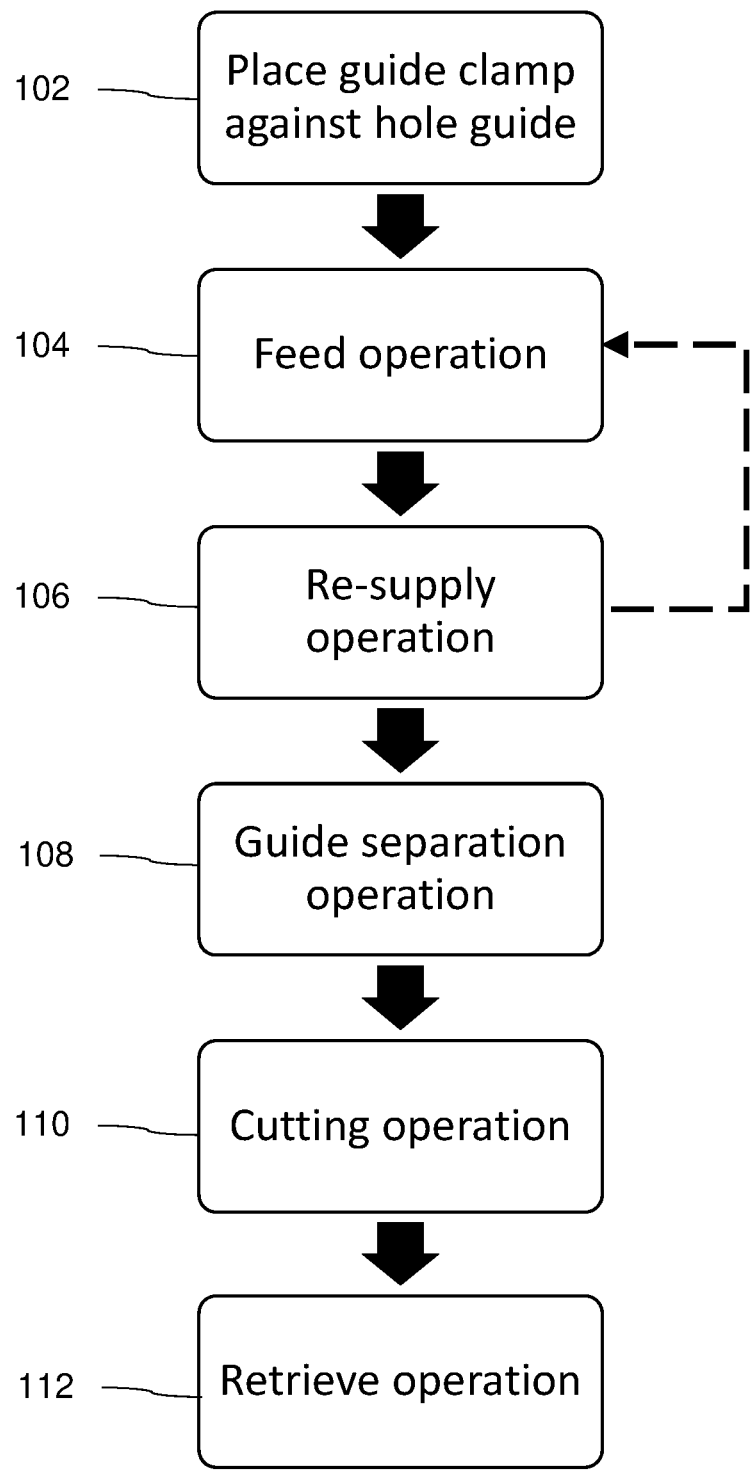
FIG. 10 is a flowchart of the method.

FIG. 10 is a flowchart showing the steps of the method as described above with respect to FIGS. 1-9. In block 102, the guide clamp is placed against the hole guide.

In block 104, a feed operation is conducted in which the feed clamp clamps a rod whilst moving towards the laminated material to feed an end section of the rod through the guide clamp into a hole in the laminated material. In block 106, a resupply operation is conducted in which the feed clamp releases the rod and moves relative the rod along a return direction away from the laminated material whilst the guide clamp clamps the rod. As indicated by the dashed line, in some examples the feed operation and resupply operation may be repeated in sequence to feed a predetermined length of rod into the hole in stages.

In block 108, a guide separation is conducted by moving the guide clamp away from the laminated material. In block 110, a cutting operation in which the rod is cut to separate the end section of the rod. In block 112, a retrieve operation is conducted by causing relative movement of the feed clamp and the guide clamp whilst the feed clamp clamps the rod so that a protruding end of the rod extending beyond the guide clamp is retrieved to terminate within the guide clamp.

By providing both a feed clamp and a guide clamp spaced apart along a rod feed path, one clamp may retain the rod whilst the other moves relative the rod. This may result in a number of advantages.

For example, this enables the guide clamp to serve as a guide during a feed operation, permitting movement of the rod through the guide. This enables the guide clamp to be placed against the hole guide, or even directly against the laminated material over a hole, to protect the end of the rod and prevent it from becoming misaligned. This may prevent inadvertent misalignment or deflection of the end of the rod in use, thereby preventing rod breakage and stoppage to rod insertion processes.

In contrast, in a previously considered arrangement using a feed clamp alone, an unprotected and protruding end of the rod must extend beyond the feed clamp prior to insertion, as the feed clamp must be initially be spaced apart from the laminated material in order to move towards it to insert the rod. In order to successfully insert the rod, alignment should be highly accurate and the hole should present no resistance to the insertion of the rod that could cause it to deflect and rupture before insertion is complete.

Further after the feed operation as described above, the guide clamp can clamp the rod, thereby permitting the feed clamp to move along the return direction to clamp an upstream (or aft, or proximal) portion of the rod for feeding in a subsequent feeding operation. In particular, when the guide clamp clamps the rod, the feed clamp can release the rod without the end section of the rod being drawn out of the hole under tension from the rod supply.

Further, the guide clamp can move away from the laminated material when the feed clamp clamps the rod in preparation for cutting. As described above, this permits the cutter to deflect the portion of the rod extending from the guide. In contrast, if the guide were to remain against the cutter, movement of the cutter would result in shearing at two points: at the interface between the cutter and the guide foot, and at the interface between the cutter and the guide or an upstream position. Accordingly, a small portion of rod would be loose on the surface of the laminate, which may disrupt subsequent automated insertion operations.

Although an example insertion method has been described in which a single rod is inserted into a respective hole, in other examples the clamps of the feed clamp unit and the guide clamp unit may clamp and guide multiple rods simultaneously.

Accordingly, the method as described above may be used to insert a plurality of rods into a respective plurality of holes in a laminated material.

Figure 11:
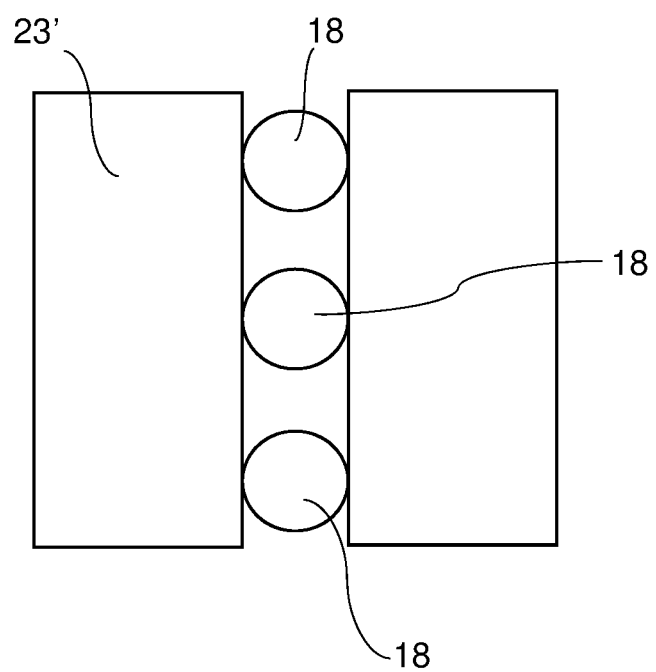
FIG. 11 schematically shows a clamp for clamping multiple rods.

FIG. 11 shows an example feed clamp 23' as viewed in cross section in a plane normal to the feed direction, which is configured to clamp and guide a plurality of reinforcing rods 18. The clamp 23' comprises two opposing jaws defining a slot therebetween. The slot has a length corresponding to the length of the opposing surfaces of the jaws along a direction normal to the feed direction and normal to a clamping direction of the jaws. In this example, the slot has a length sufficient to accommodate three reinforcing rods. In other examples, a slot may accommodate more than or less than three reinforcing rods. The opposing surfaces of the jaws may be profiled so that each reinforcing rod 18 is retained at a predetermined position along the slot, such that the reinforcing rods are distributed in the slot according to a predetermined pattern. For example, the opposing surfaces may define shallow recesses for receiving the rods. In some examples, the opposing surfaces of the jaws may comprise a layer of compliant material (such as a compressible material) for gripping the reinforcing rods.

The insertion apparatus as described above may be configured to use feed clamps and guide clamps as described above with respect to FIG. 11, or other clamps configured to clamp and guide a plurality of rods.

Similarly, whilst an example hole guide, an example cutter and an example guide foot have been described as having a single hole therethrough, in other examples a hole guide, cutter and guide foot may have a plurality of holes, which may be arranged in a pattern corresponding to a pattern in which the rods are retained in the clamps.

Although an example has been described in which there are two feed clamps provided on a feed clamp unit, it will be appreciated that there may be a single feed clamp. In some examples, the use of two feed clamps may provide redundancy for clamping the rod. Further, in examples where each clamp is configured to clamp multiple reinforcing rods, the two feed clamps may be configured to clamp the rods in different patterns. This may facilitate gradual redirection of the rods along the extent of the feed clamp unit from a pattern in which they are received from the redirect rolls (which may be relatively bulky and spaced apart) to a configuration in which they are to be provided to the guide clamp and the hole guide.

Although an example method has been described in which the resupply operation occurs before the guide separation operation and the cutting operation, in other examples the resupply operation could occur after the guide separation operation and the cutting operation, if the feed clamp unit does not abut the guide clamp at the end of the feed operation.

The invention claimed is:

1. A method of inserting a reinforcing rod into a hole in a laminated material, the method comprising:
   a feed operation in which a feed clamp clamps a rod whilst moving towards the laminated material to feed an end section of the rod through a guide clamp into a hole in the laminated material;
   a re-supply operation in which the feed clamp releases the rod and moves relative the rod along a return direction away from the laminated material whilst the guide clamp clamps the rod; and
   placing the guide clamp against a hole guide before the feed operation so that there is a continuous feed path for the rod through the guide clamp and the hole guide.

2. A method according to claim 1, further comprising a cutting operation in which the rod is cut after the feed operation to separate the end section.

3. A method according to claim 2, further comprising a guide separation operation comprising moving the guide clamp away from the laminated material before cutting the rod so that the guide clamp is spaced apart from the end section for cutting.

4. A method according to claim 3, wherein the re-supply operation takes place before the guide separation operation.

5. A method according to claim 3, further comprising a retrieve operation in which there is relative movement between the feed clamp and the guide clamp whilst the feed clamp clamps the rod so that a protruding end of the rod extending beyond the guide clamp after the guide separation operation is retrieved to terminate within the guide clamp.

6. A method according to claim 5, wherein the re-supply operation takes place after the retrieve operation.

7. A method according to claim 1, wherein the hole guide comprises a guide foot engaging the laminated material and a cutter disposed between the guide foot and the guide clamp, wherein the method comprises cutting the rod after the feed operation to separate the end section by moving the cutter relative the guide foot.

8. A method according to claim 1, wherein movement of the feed clamp towards the laminated material in the feed operation is stopped by abutment of the feed clamp with a feed stop.

9. An insertion head for inserting a reinforcing rod into a hole in a laminated material, the insertion head comprising:
a clamp support;
a feed clamp and a guide clamp coupled to the clamp support and spaced apart along a rod feed path; and
a hole guide for guiding an end section of the rod into a pin hole;
wherein the feed clamp is moveable towards the guide clamp whilst clamping a rod to feed an end section of the rod through the guide clamp into a hole of the laminated material;
wherein the guide clamp is configured to selectively clamp the rod to permit the feed clamp to move relative the rod along a return direction away from the guide clamp; and
wherein at least the guide clamp is moveable relative the hole guide to align the guide clamp with the hole guide so that there is a continuous feed path for the rod through the guide clamp and the hole guide.

10. An insertion head according to claim 9, further comprising a cutter for cutting the rod to separate the end section.

11. An insertion head according to claim 9, wherein the clamp support is moveable relative the hole guide to align the guide clamp with the hole guide.

12. An insertion head according to claim 9, wherein the hole guide comprises a guide foot for engaging the laminated material and a cutter disposed between the guide foot and the guide clamp, wherein the cutter is moveable relative the guide foot to cut the rod and separate the end section.

13. An insertion head according to claim 9, comprising a feed stop configured to stop movement of the feed clamp towards the guide clamp to feed the end section through the guide clamp.

14. Insertion equipment comprising:
an insertion head in accordance with claim 9; and
a controller configured to control movement of the feed clamp and the guide clamp to:
execute a feed operation in which the feed clamp clamps the rod whilst moving towards the laminated material to feed the end section of the rod through the guide clamp into a pin hole in the laminated material; and
execute a re-supply operation in which the feed clamp releases the rod and moves relative the rod along a return direction away from the laminated material whilst the guide clamp clamps the rod,
wherein the controller is further configured to control movement of the guide clamp so that the guide clamp is positioned against the hole guide before the feed operation so that there is a continuous feed path for the rod through the guide clamp and the hole guide.

15. Insertion equipment according to claim 14, wherein the insertion head further comprises a cutter for cutting the rod to separate the end section, and wherein the controller is further configured to execute a cutting operation after the feed operation by moving the cutter to separate the end section.

16. Insertion equipment according to claim 15, wherein the controller is further configured to execute a guide separation operation by moving the guide clamp away from the laminated material before the cutting operation so that the guide clamp is spaced apart from the end section for cutting.

17. Insertion equipment according to claim 16, wherein the controller is configured to execute the re-supply operation before the guide separation operation.

18. Insertion equipment according to claim 16, wherein the controller is further configured to execute a retrieve operation by causing relative movement between the feed clamp and the guide clamp whilst the feed clamp clamps the rod so that a protruding end of the rod extending beyond the guide clamp after the guide separation operation is retrieved to terminate within the guide clamp.

19. Insertion equipment according to claim 18, wherein the controller is configured to execute the re-supply operation after the retrieve operation.

20. Insertion equipment according claim 16, wherein the controller is further configured to control movement of the feed clamp and guide clamp to move the feed clamp and the guide clamp away from the pin hole after the re-supply operation and cutting operation in preparation for tamping of the end section.

* * * * *